US012803716B2

(12) United States Patent
Cui et al.

(10) Patent No.: US 12,803,716 B2
(45) Date of Patent: Nov. 17, 2026

(54) METHODS, DEVICES AND SYSTEMS FOR HARQ FEEDBACK DISABLING ACCORDING TO RECEIVED PARAMETER AND THRESHOLD

(71) Applicant: ZTE CORPORATION, Shenzhen (CN)

(72) Inventors: Fangyu Cui, Shenzhen (CN); Nan Zhang, Shenzhen (CN); Jianqiang Dai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 325 days.

(21) Appl. No.: 18/476,980

(22) Filed: Sep. 28, 2023

(65) Prior Publication Data

US 2024/0031077 A1 Jan. 25, 2024

Related U.S. Application Data

(63) Continuation of application No. PCT/CN2021/084842, filed on Apr. 1, 2021.

(51) Int. Cl.

*H04L 1/1825* (2023.01)
*H04L 1/08* (2006.01)
*H04L 1/1812* (2023.01)
*H04L 1/1822* (2023.01)
*H04L 1/1867* (2023.01)

(52) U.S. Cl.

CPC .............. *H04L 1/1825* (2013.01); *H04L 1/08* (2013.01); *H04L 1/1812* (2013.01); *H04L 1/1822* (2013.01); *H04L 1/1893* (2013.01); *H04L 1/1896* (2013.01)

(58) Field of Classification Search

None

See application file for complete search history.

(56) References Cited

U.S. PATENT DOCUMENTS

2021/0050950 A1 2/2021 Zhou et al.
2022/0263608 A1 * 8/2022 Wei ........................ H04L 1/1854
2023/0075748 A1 * 3/2023 Yan ........................ H04L 1/0003

FOREIGN PATENT DOCUMENTS

CN 111756495 A 10/2020
CN 112204908 A 1/2021
WO WO-2019/160737 A1 8/2019
WO WO-2020/125473 A1 6/2020

(Continued)

OTHER PUBLICATIONS

Ericsson Blog on Enhanced 4G LTE coverage for Machine-Type Communications and Internet of Things (Year: 2017).*

(Continued)

*Primary Examiner* — Ayaz R Sheikh
*Assistant Examiner* — Christopher R Davis
(74) *Attorney, Agent, or Firm* — Foley & Lardner LLP

(57) ABSTRACT

A system and method for disabling HARQ feedback is disclosed. In one aspect, a wireless communication method includes receiving, by a wireless communication device from a wireless communication node, at least one parameter and at least one threshold; and determining, by the wireless communication device, whether to disable feedback in at least one hybrid automatic repeat request (HARQ) process according to the at least one parameter and the at least one threshold.

20 Claims, 7 Drawing Sheets

(56) References Cited

FOREIGN PATENT DOCUMENTS

| | | | |
|---|---|---|---|
| WO | WO-2021/026849 | A1 | 2/2021 |
| WO | WO-2021/027574 | A1 | 2/2021 |

OTHER PUBLICATIONS

Examination Search Report on CA Appl. No. 3214768 dated Jul. 15, 2025 (4 pages).
International Search Report and Written Opinion for PCT Appl. No. PCT/CN2021/084842, mailed Dec. 31, 2021 (8 pages).
Asustek, "Correction on SL LCP restriction of configured grant type 1", 3GPP TSG-RAN WG2 Meeting #113 electronic, R2-2101940, Feb. 5, 2021, Online (5 pages).
Extended European Search Report for EP Appl. No. 21933936.3, dated Mar. 27, 2024 (9 pages).
Communication pursuant to Article 94(3) EPC for EP Appl. No. 21933936.3, dated Mar. 18, 2026 (6 pages).
First Office Action on KR Appl. No. 10-2023-7033230 dated Aug. 20, 2026 (9 pages with English translation).

* cited by examiner

METHODS, DEVICES AND SYSTEMS FOR HARQ FEEDBACK DISABLING ACCORDING TO RECEIVED PARAMETER AND THRESHOLD

CROSS-REFERENCE TO RELATED APPLICATION

This application claims the benefit of priority under 35 U.S.C. § 120 as a continuation of PCT Patent Application No. PCT/CN2021/084842, filed on Apr. 1, 2021, the disclosure of which is incorporated herein by reference in its entirety.

TECHNICAL FIELD

The disclosure relates generally to wireless communications and, more particularly, to systems and methods for hybrid automatic repeat request (HARQ) feedback disabling.

BACKGROUND

In a hybrid automatic repeat request (HARQ) mechanism, a HARQ process can perform a retransmission after receiving feedback. If all of the HARQ processes have completed a transmission but none of the feedback is received due to a large round trip time (RTT), HARQ stalling may occur.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one aspect, a wireless communication method includes receiving, by a wireless communication device from a wireless communication node, at least one parameter and at least one threshold; and determining, by the wireless communication device, whether to disable feedback in at least one hybrid automatic repeat request (HARQ) process according to the at least one parameter and the at least one threshold.

In some embodiments, the wireless communication method includes determining, by the wireless communication device, a transmission metric according to the at least one parameter; and determining, by the wireless communication device, to enable feedback in at least one HARQ process of the at least one HARQ process, responsive to the transmission metric being greater than, or greater than or equal to, a first threshold of the at least one threshold, and determining, by the wireless communication device, to disable the feedback in the at least one HARQ process, responsive to the transmission metric being less than or equal to, or less than, the first threshold.

In another aspect, a wireless communication method includes sending, by a wireless communication node to a wireless communication device, at least one parameter and at least one threshold, wherein the wireless communication device determines a transmission metric according to the at least one parameter, and determines whether to disable feedback in at least one hybrid automatic repeat request (HARQ) process by comparing the transmission duration with the at least one threshold.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

A. Network Environment and Computing Environment

Figure 1:
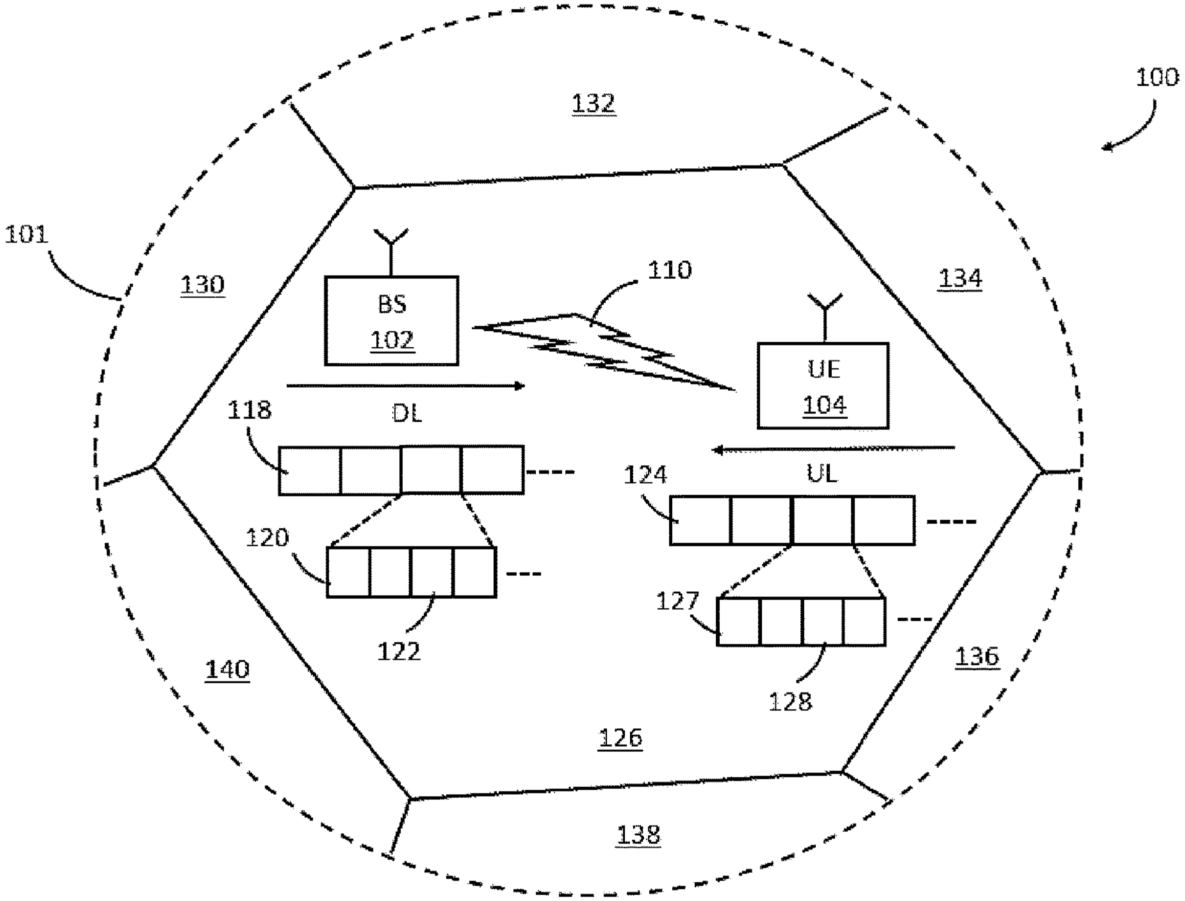
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
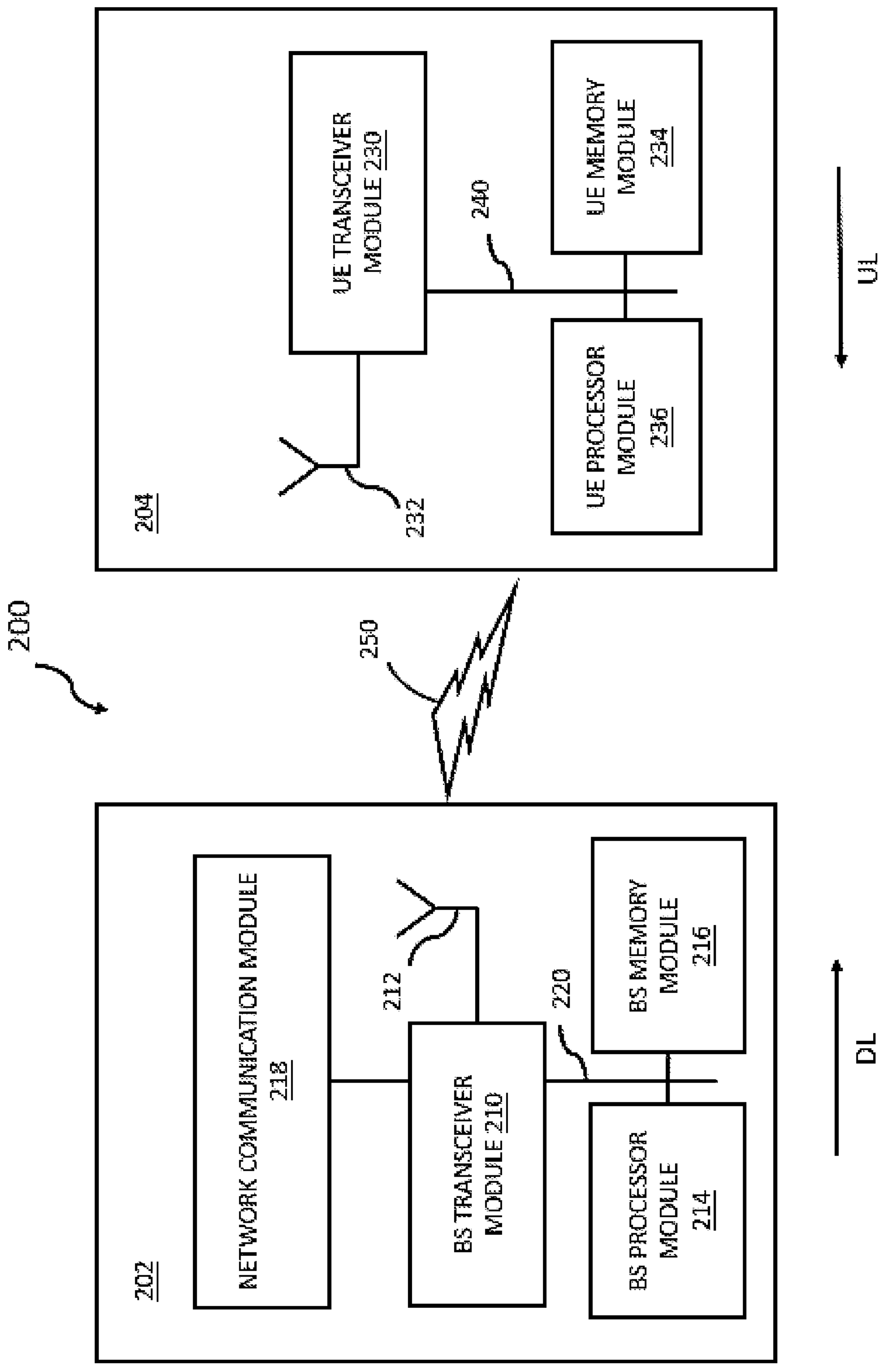
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

B. HARQ Feedback Disabling

In a hybrid automatic repeat request (HARQ) mechanism, a HARQ process can perform a retransmission after receiving feedback. When a propagation delay is long, e.g., in a non-terrestrial network (NTN), the HARQ process will wait a long time for the feedback (e.g., acknowledgement/response regarding receipt/non-receipt of transmission) before the next transmission. If all of the HARQ processes have completed a transmission but none of the feedback is received due to a large round trip time (RTT), a transmitter may stop transmitting and HARQ stalling may occur. For example, in traditional terrestrial network (TN), RTT can be tens or hundreds of microseconds, which may be negligible compared to scheduling delay and transmission duration. However, in NTN, RTT can be as long as several hundreds of milliseconds, which can be longer than the transmission duration of one TB. In some embodiments, if two HARQ processes are supported, a new transmission scheduling for a first HARQ process cannot be received before a second HARQ process finishes its transmission due to large propagation delay of HARQ feedback. As a result, a time interval between the finish time of transmission of the second HARQ process and the start time of the new transmission of the first HARQ process may be wasted (e.g., idle) due to no transmission, e.g., HARQ stalling. In order to avoid the HARQ stalling and increase throughput, HARQ feedback disabling (e.g., disabling of a portion of the HARQ process that is associated with waiting for the feedback and/or processing of the feedback) can be applied.

However, HARQ feedback disabling can be selective. In order to increase the detection performance, repetition can be applied for data transmission in Narrowband-Internet of Things (NB-IoT) or enhanced Machine Type Communication (eMTC) over the NTN. Moreover, a scheduling delay can be large for certain cases. If a transmission duration of one transmission block (TB) is longer than the RTT, the HARQ stalling may not occur and the HARQ feedback can be enabled to improve detection performance. Otherwise, HARQ feedback can be disabled to improve throughput. What is needed is a system and method to optimally configure the HARQ feedback disabling.

Figure 3:
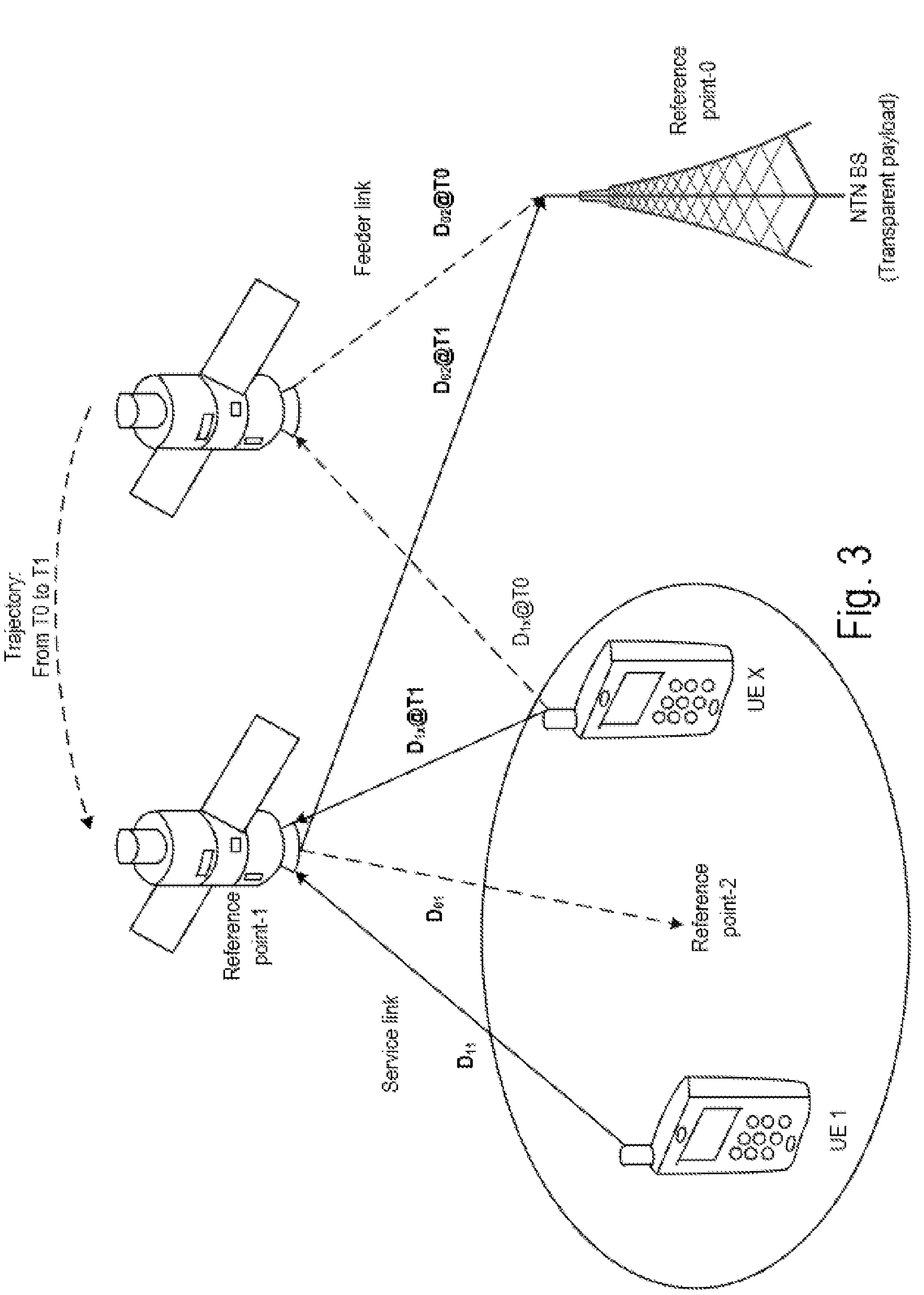
FIG. 3 illustrates a block diagram of a non-terrestrial network (NTN), in accordance with some embodiments of the present disclosure.

FIG. 3 illustrates a block diagram of an NTN, in accordance with some embodiments of the present disclosure. In the NTN, ground UEs (e.g., a user equipment, the UE 104, the UE 204, a mobile device, a wireless communication device, a terminal, etc.) can be served by an aerial vehicular entity, e.g., a satellite (e.g., Reference Point-1 in FIG. 3), a high altitude pseudo-satellite (HAPS), or an air-to-ground (ATG). The aerial vehicular entity can be in communication with a BS (e.g., a base station, the BS 102, the BS 202, a gNB, an eNB, a wireless communication node, etc.). This architecture can be very attractive since it may cover UEs and BSs in remote areas.

For an NTN, especially with the aerial vehicular entity in geosynchronous equatorial orbit (GEO), the RTT between the UE and the BS can be as long as several hundreds of milliseconds due to long (signal transmission/propagation) distance(s). As a result, HARQ stalling may happen, which can decrease the throughput.

Figure 4:
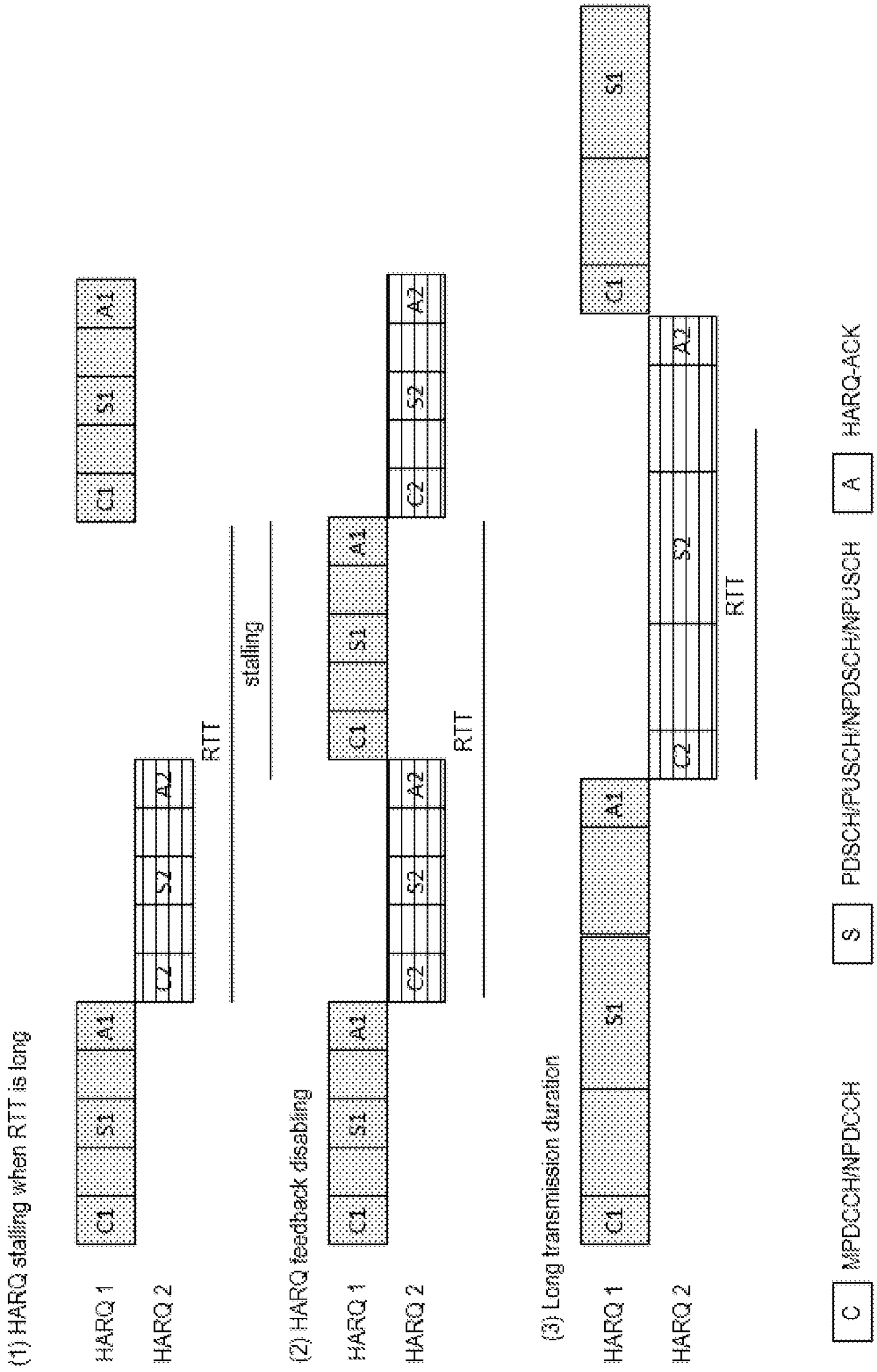
FIG. 4 illustrates a diagram of HARQ stalling and HARQ feedback disabling, in accordance with some embodiments of the present disclosure.

FIG. 4 illustrates a diagram of HARQ stalling and HARQ feedback disabling, in accordance with some embodiments of the present disclosure. HARQ stalling is shown in (1) of FIG. 4. The HARQ feedback disabling can be implemented at least for new radio (NR)-NTN. By disabling the HARQ feedback of one HARQ process, the UE can continuously transmit new TBs without performing a stop and wait procedure as shown in (2) of FIG. 4. As a result, the HARQ stalling due to a large RTT can be avoided and throughput can be increased. However, a detection performance can decrease at a same time when there is no HARQ retransmission. Hence, HARQ feedback disabling can be configured in NR-NTN to make a tradeoff between throughput and detection performance.

Repetition is generally applied in data transmission (e.g., in IoT-NTN or eMTC) to improve the detection performance. If a repetition number is large enough, a duration of transmitting one TB may be longer than RTT. In such a case, the HARQ stalling may not occur even if HARQ feedback is enabled as shown in (3) of FIG. 4. The disabling configuration can be associated with parameters related to transmission duration, e.g., the repetition number and scheduling delay, as described below.

Different types of transmission settings can be supported to serve different scenarios. The transmission settings can include at least one of transmission modes (e.g., CEmodeA, CEmodeB) or orbit heights/elevation angles (e.g., GEO, LEO, MEO, etc.). In some embodiments, types of transmission setting includes one of CEmodeA, CEmodeB. In some embodiments, the transmission settings are quasi-statically configured, wherein responsive to one type of setting, HARQ feedback is always configured a specific way. In some embodiments, the transmission settings are dynamically configured, wherein responsive to a type of setting, HARQ feedback is configurable (e.g., can be enabled or disabled). In some embodiments, a wireless communication method includes determining, by the wireless communication device, whether to disable feedback in the at least one HARQ process according to a type of transmission setting of the wireless communication device. In some embodiments, the wireless communication method includes determining, by the wireless communication device, to disable the feedback when in a first type of transmission setting, and to disable or enable the feedback when not in the first type of transmission setting; or determining, by the wireless communication device, to enable the feedback when in the first type of transmission setting, and to disable or enable the feedback when not in the first type of transmission setting. In some embodiments, the wireless communication method includes determining, by the wireless communication device, to enable the feedback when in the first type of transmission setting; and determining, by the wireless communication device, to disable the feedback when not in the first type of transmission setting.

Different types of transmission modes can be supported to serve different scenarios. for Coverage Enhancement (CE) levels 0 and 1, CEmodeA can be applied (e.g., for good/better channel quality), in which a maximum repetition number of physical downlink shared channels (PDSCH) or physical uplink shared channels (PUSCH) can be a first repetition number (e.g., 32) and a number of HARQ processes can be a first process number (e.g., 8). For CE levels 2 and 3, CEmodeB can be applied (e.g., for bad/worse channel quality), in which a maximum repetition number can be a second repetition number (e.g., 2048) greater than the first repetition number (e.g., because the SNR is lower) and a number of HARQ processes can be a second process number (e.g., 2) less than the first process number. The variable range of transmission duration may be different in these two modes. Hence, we may use different disabling strategies for these two modes. HARQ feedback configuration of one mode can be quasi-static, which can save cost.

For example, if the UE is in CEmodeA, the HARQ feedback is enabled; otherwise, the disabling of the HARQ feedback is configurable. In some embodiments, CEmodeA is more tolerable to a long RTT than CEmodeB when a repetition number is same. When the RTT is lower than a threshold, the HARQ feedback in CEmode can be enabled. In some embodiments, the wireless communication method includes, when the type is CEmodeA, enabling, by the wireless communication device, the feedback and, when the type is not CEmodeA, disabling or enabling, by the wireless communication device, the feedback according to a configurable parameter.

In some embodiments, if the UE is in CEmodeB, the HARQ feedback is disabled; otherwise, the disabling of the HARQ feedback is configurable. For example, when signal-to-noise ratio (SNR) is high enough to ensure a repetition number smaller than a threshold (e.g., 32), CEmodeB is less tolerable to the long RTT due to a low HARQ process number. In this case, if RTT is larger than a maximum tolerable RTT of CEmodeB but smaller than that of CEmodeA, HARQ feedback can be disabled. In some embodiments, the wireless communication method includes, when the type is CEmodeB, disabling, by the wireless communication device, the feedback and, when the type is not CEmodeB, disabling or enabling, by the wireless communication device, the feedback according to a configurable parameter.

In some embodiments, if the UE is in CEmodeA, the HARQ feedback is disabled; otherwise, the disabling of the HARQ feedback is configurable. In some embodiments, a maximum duration of CEmodeB is longer (e.g., greater or larger) than that of CEmodeA. Hence, if RTT is longer than a maximum tolerable/acceptable/operational range of CEmodeA, the HARQ feedback in CEmodeA can be disabled. In some embodiments, the wireless communication method includes, when the type is CEmodeA, disabling, by the wireless communication device, the feedback and, when the type is not CEmodeA, disabling or enabling, by the wireless communication device, the feedback according to a transmission type or other transmission metric.

In some embodiments, if the UE is in CEmodeB, the HARQ feedback is enabled; otherwise, the disabling of the HARQ feedback is configurable. In some embodiments, when RTT is long but smaller (e.g., less) than a maximum range of CEmodeA, CEmodeA is configurable but CEmodeB may be enabled. In some embodiments, the wireless communication method includes, when the type is CEmodeB, enabling, by the wireless communication device, the feedback and, when the type is not CEmodeB, disabling or enabling, by the wireless communication device, the feedback according to a configurable parameter.

In some embodiments, if the UE is served by a GEO satellite, the HARQ feedback is disabled; otherwise, the disabling of the HARQ feedback is configurable. In some embodiments, as the RTT in GEO case may be extremely long (e.g., up to several hundreds of milliseconds), the HARQ feedback can be disabled to avoid HARQ stalling and increase throughput. In some embodiments, as the RTT in LEO case can vary frequently, the HARQ feedback can be configured according to situations/parameters.

In some embodiments, the HARQ is configurable by downlink control information (DCI). In some embodiments, the wireless communication method includes receiving, by the wireless communication device from the wireless communication node, a value of the configurable parameter via a DCI transmission. While some disabling strategies have been shown, other disabling strategies are within the scope of the present disclosure.

Repetition can be utilized in NB-IoT and eMTC systems to improve the detection performance at a receiver. When the transmission duration of one TB is long enough, the HARQ stalling may be less probable and the HARQ feedback disabling may be configurable (e.g., may not be needed, can be adjusted/controlled according to different situations, etc.) even if in NTN scenarios in which the RTT is long; otherwise, the HARQ feedback can be disabled to improve throughput.

Parameters such as the repetition number (of data transmission), resource assignment of each repetition (including time length of each repetition), and scheduling delay of NB-IoT and eMTC can be adjusted per transmission through the DCI. The parameters can affect a transmission duration of one TB. Therefore, the parameters may be related to the HARQ stalling. In some embodiments, the BS indicates to the UE whether the HARQ feedback is disabled per transmission using other signaling instead of, or in addition to, DCI, as described below.

In some embodiments, a wireless communication method includes receiving, by a wireless communication device from a wireless communication node, at least one parameter and at least one threshold; and determining, by the wireless communication device, whether to disable feedback in at least one hybrid automatic repeat request (HARQ) process according to the at least one parameter and the at least one threshold. In some embodiments, the at least one parameter is a repetition number, a resource assignment, or a scheduling delay. In some embodiments, a wireless communication method includes sending, by a wireless communication node to a wireless communication device, at least one parameter and at least one threshold, wherein the wireless communication device determines (e.g., calculates, computes) a transmission metric according to the at least one parameter, and determines whether to disable feedback in at least one hybrid automatic repeat request (HARQ) process by comparing the transmission duration with the at least one threshold.

In some embodiments, the UE determines disabling by a transmission metric such as a transmission duration, one of the parameters (e.g., a repetition number, a resource assignment, a scheduling delay), or any two of the parameters. In some embodiments, the wireless communication method includes determining, by the wireless communication device, a transmission metric according to the at least one parameter; and determining, by the wireless communication device, to enable feedback in a first HARQ process of the at least one HARQ process, responsive to the transmission metric being greater than, or greater than or equal to, a first threshold of the at least one threshold, and determining, by the wireless communication device, to disable the feedback in the first HARQ process, responsive to the transmission metric being less than or equal to, or less than, the first threshold. For example, the transmission metric is the parameter indicated by the BS and the UE compares the indicated parameter to the threshold (e.g., directly). In another example, the transmission metric can be calculated based on the parameters, e.g., by converting the indicated repetition number and/or scheduling timing into a time duration and comparing the time duration to the threshold.

In some embodiments, the wireless communication method includes determining, by the wireless communication device, a transmission metric according to the at least one parameter; and determining, by the wireless communication device, to disable feedback in a first HARQ process of the at least one HARQ process, responsive to the transmission metric being greater than, or greater than or equal to, a first threshold of the at least one threshold, and determining, by the wireless communication device, to enable the feedback in the first HARQ process, responsive to the transmission metric being less than or equal to, or less than, the first threshold.

In some embodiments, feedback is enabled by default and/or is normal operation. In some embodiments, disabling the feedback introduces new action, which can be upon satisfaction of conditions.

As described above, in some embodiments, the UE determines disabling by the transmission duration. The BS may first indicate a transmission duration threshold to the UE in system information block (SIB) or radio resource control (RRC) signaling. In some embodiments, the wireless communication method includes receiving, by the wireless communication device from the wireless communication node, the at least one threshold via a RRC or SIB signaling. In some transmissions, the UE may obtain/receive the configuration of a repetition number (e.g., a repetition number field in DCI-NO for DL NB-IoT, DCI-N1 for UL NB-IoT, DCI 6-0A/DCI 6-0B for DL eMTC, or DCI 6-1A/DCI 6-1B for UL eMTC), a resource assignment (e.g., a resource assignment field, a time length of one repetition), and a scheduling delay (e.g., scheduling delay field) for each transmission in the DCI. In some embodiments, the wireless communication method includes receiving, by the wireless communication device from the wireless communication node, the at least one parameter via a downlink control information (DCI) transmission. Moreover, the repetition number of Narrowband PDCCH (NPDCCH)/machine-type PDCCH (MPDCCH) and HARQ-acknowledgement (ACK) can be configured by the RRC signaling. A numerology may be known once the UE accesses the network. The UE can calculate a total transmission duration of one TB by combining some of the parameters.

Figure 5:
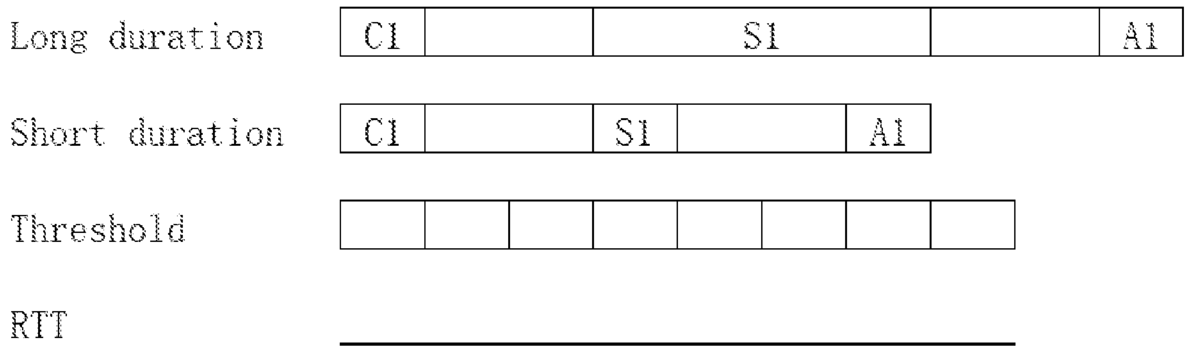
FIG. 5 illustrates a diagram of determining disabling by a transmission duration, in accordance with some embodiments of the present disclosure.

FIG. 5 illustrates a diagram of determining disabling by a transmission duration, in accordance with some embodiments of the present disclosure. By comparing the transmission duration with the indicated threshold, the UE can determine the configuration of HARQ feedback as shown in FIG. 5. If the duration is larger than the threshold in FIG. 5, the HARQ feedback can enabled; otherwise, the HARQ feedback can be disabled. In some embodiments, the RTT is similar to the threshold, which may indicate that HARQ stalling is avoided when transmission duration is longer than the threshold.

In some embodiments, all of the parameters related to transmission duration are used in determining whether to disable the HARQ feedback. In some of the embodiments, some of the parameters may be fixed for a long time and some of the parameters are omitted in determining whether to disable the HARQ feedback.

Figure 6:
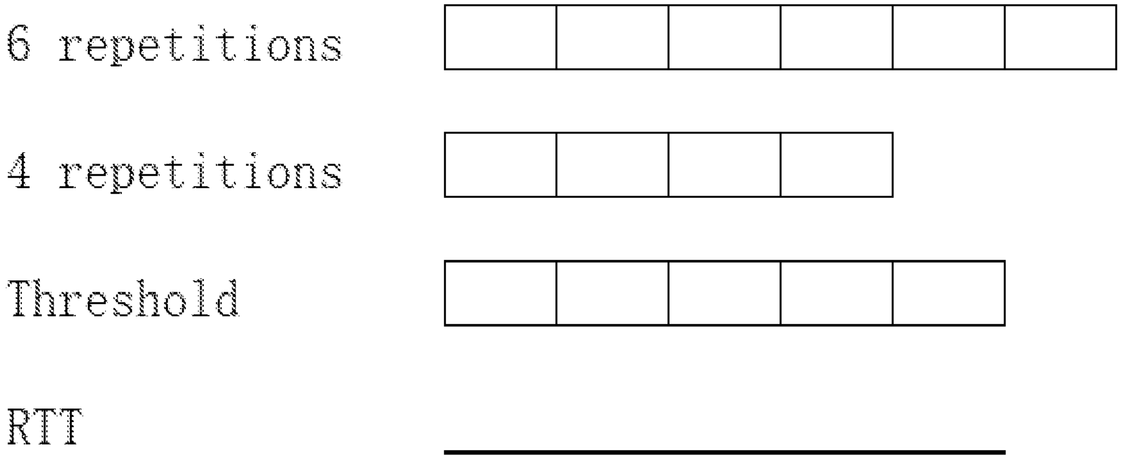
FIG. 6 illustrates a diagram of determining disabling by a repetition number, in accordance with some embodiments of the present disclosure.

FIG. 6 illustrates a diagram of determining disabling by a repetition number, in accordance with some embodiments of the present disclosure. As described above, the UE may determine disabling by the repetition number. The BS first may indicate the repetition number threshold to the UE in the SIB or the RRC signaling. In some transmissions, the repetition number for each transmission is controlled and indicated in the DCI. If the repetition number is larger than the threshold, the UE can determine the configuration of the HARQ feedback as shown in FIG. 6. If the duration is larger than the threshold as shown in FIG. 6, the HARQ feedback can be enabled; otherwise, the HARQ feedback can be disabled.

The scheduling delay and duration of one repetition may be invariant when referring to same threshold. Thus, when these parameters change, the threshold may be updated. For example, if the time length for one repetition is doubled, the repetition number threshold may be reduced by half in order to keep a same transmission duration.

As described above, the UE may determine disabling by a resource assignment or a scheduling delay. The procedures for disabling by a resource assignment or a scheduling delay may be similar to the procedures for disabling by a repetition number, e.g., comparing the obtained parameter with its own threshold instead of calculating total transmission duration.

As described above, the UE may determine disabling by any combination of two factors among repetition number, resource assignment, and scheduling delay. In some embodiments, the transmission metric is indicated by a value of the repetition number, the resource assignment, or the scheduling delay, or calculated/determined using respective values of at least two of: the repetition number, the resource assignment, and the scheduling delay.

The RTT in NTN can vary/change with elevation angle (e.g., height of orbit). Therefore, the BS can configure different transmission duration thresholds for the UEs in different transmission resources (e.g., beams). When the UE moves from one beam to another, the threshold can be updated. In some embodiments, the wireless communication method includes a threshold corresponding to a first transmission resource of the wireless communication device, and a second threshold of the at least one threshold corresponds to a second transmission resource of the wireless communication device. In some embodiments, the transmission resource includes or corresponds to a beam or beam direction of the wireless communication device.

The transmission duration may vary/change for different UEs within/in/having/associated with a same transmission resource (e.g., beam), e.g., when the UEs are configured with different resource assignment so that a time length of one repetition is different. In this case, the UEs with a short transmission duration (e.g., a transmission duration that is less than a first threshold and a second threshold) may disable all of the HARQ processes; UEs with medium transmission (e.g., a transmission duration that is greater than a first threshold, but less than a second threshold) may disable only part of HARQ processes; and UEs with long transmission (e.g., a transmission duration that is greater than a first threshold and a second threshold) may enable all HARQ processes. Therefore, the BS can configure different transmission duration thresholds for the UEs in same transmission resources to enable different disabling actions for UEs with different transmission durations.

Moreover, activation of the functionality (e.g., the determination of the HARQ feedback disabling based on the DCI) may be based on the BS. Once the BS indicates the thresholds to the UE, the UE can determine or identify that this DCI-based HARQ feedback enabling/disabling method is applied. There may be no need for further activation signaling to activate/initiate the functionality or method.

In some embodiments, the HARQ stalling can be avoided when (e.g., only) a part/portion of the HARQ processes is feedback disabled, for instance especially when the HARQ stalling time is not significantly shorter than RTT. Hence, multiple transmission duration thresholds can be configured and UE will perform different HARQ feedback disabling pattern.

Figure 7:
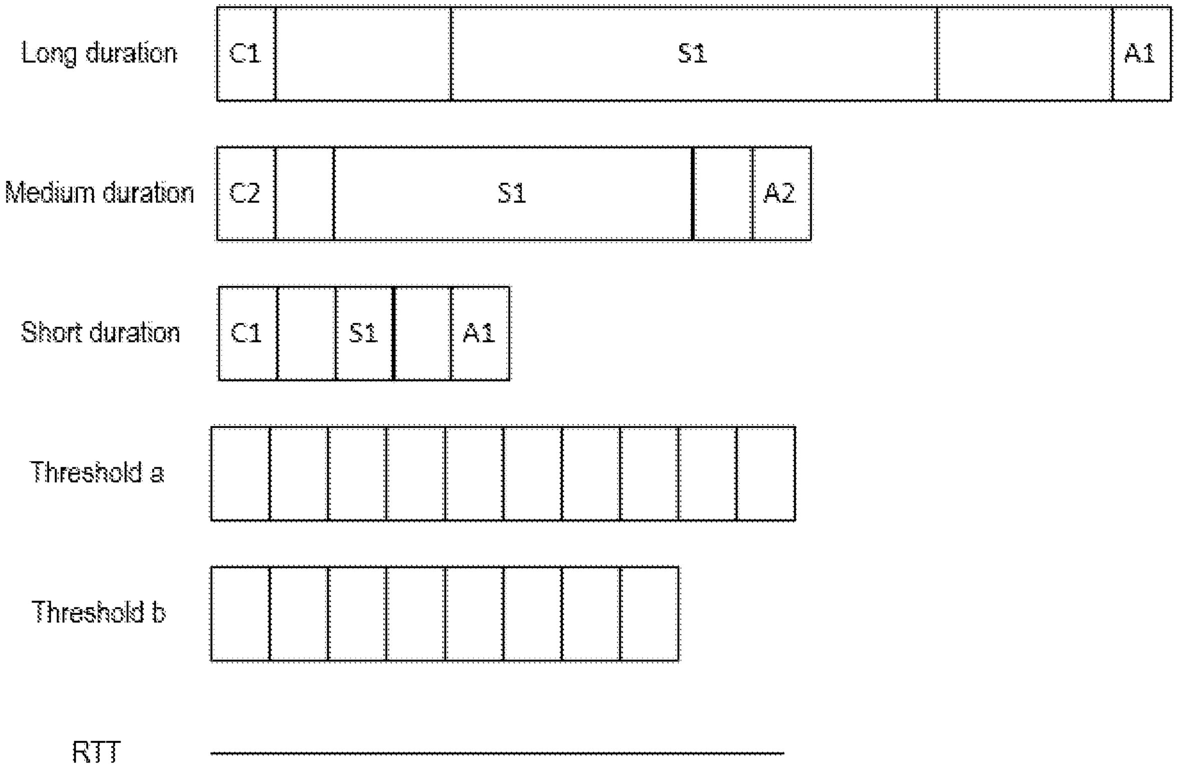
FIG. 7 illustrates a diagram of multiple thresholds, in accordance with some embodiments of the present disclosure.

FIG. 7 illustrates a diagram of multiple thresholds, in accordance with some embodiments of the present disclosure. For example, the BS could indicate two transmission duration thresholds a and b to the UE, where $a<b$. The duration length of current transmission is t. If $t<a$ as shown in the TB labeled "short duration" in FIG. 7, e.g., the transmission duration is significantly shorter than RTT, all HARQ processes can be feedback disabled. If $a<=t<b$ as shown in the TB labeled "medium duration" in FIG. 7, the transmission duration is not significantly shorter than RTT and only one HARQ process can be feedback disabled. If $t>=b$ as shown in the TB labeled "long duration" in FIG. 7, the transmission duration is approaching RTT so that none of the HARQ process can be feedback disabled. In some embodiments, the wireless communication method includes determining, by the wireless communication device, to enable feedback in a second HARQ process of the at least one HARQ process, responsive to the transmission metric being greater than, or greater than or equal to, a second threshold of the at least one threshold, and determining, by the wireless communication device, to disable the feedback in the second HARQ process, responsive to the transmission metric being less than or equal to, or less than, the second threshold.

In some embodiments, disabling HARQ feedback of some (or a part/portion) of the HARQ processes may be based on less than all of the parameters. In some embodiments, similar procedures can be used as described with respect to a single HARQ process. Moreover, more thresholds can be configured to indicate more disabling patterns.

Figure 8:
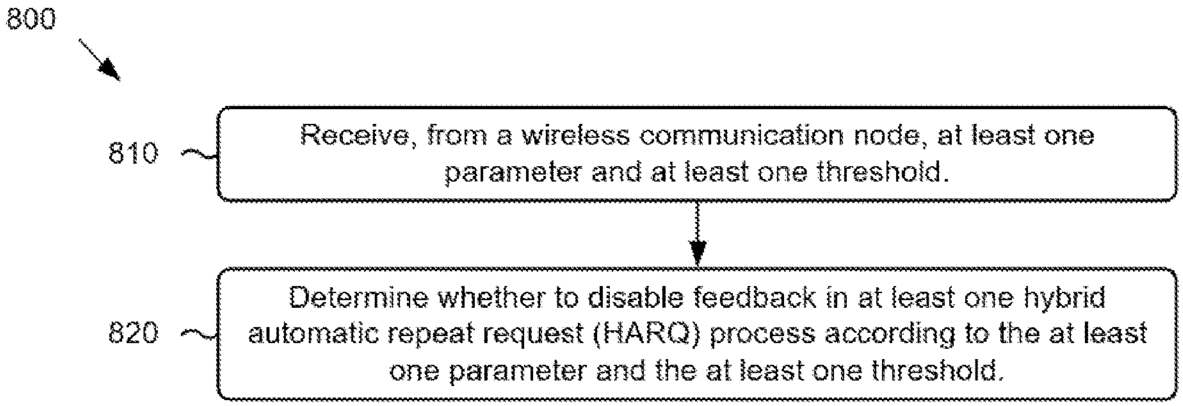
FIG. 8 illustrates a flowchart diagram illustrating a method for determining whether to disable HARQ feedback, in accordance with some embodiments of the present disclosure.

FIG. 8 illustrates a flowchart diagram illustrating a method 800 for determining whether to disable HARQ feedback, in accordance with some embodiments of the present disclosure. Referring to FIGS. 1-7, the method 800 can be performed by a wireless communication device (e.g., a UE), in some embodiments. Additional, fewer, or different operations may be performed in the method 800 depending on the embodiment.

A wireless communication device receives, from a wireless communication node, at least one parameter and at least one threshold (802). The wireless communication device determines whether to disable feedback in at least one hybrid automatic repeat request (HARQ) process according to the at least one parameter and the at least one threshold (804).

Figure 9:
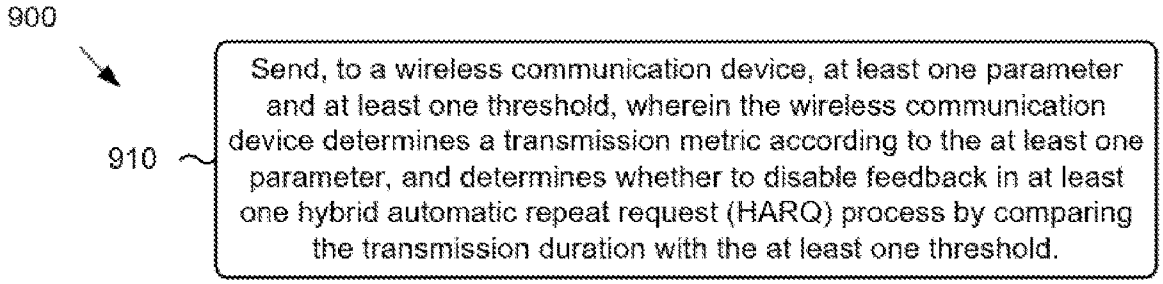
FIG. 9 illustrates a flowchart diagram illustrating a method for determining whether to disable HARQ feedback, in accordance with some embodiments of the present disclosure.

FIG. 9 illustrates a flowchart diagram illustrating a method 900 for determining whether to disable HARQ feedback, in accordance with some embodiments of the present disclosure. Referring to FIGS. 1-7, the method 900 can be performed by a wireless communication node (e.g., a BS), in some embodiments. Additional, fewer, or different operations may be performed in the method 900 depending on the embodiment.

A wireless communication node sends, to a wireless communication device, at least one parameter and at least one threshold (902). In some embodiments, the wireless communication device determines a transmission metric according to the at least one parameter, and determines whether to disable feedback in at least one hybrid automatic repeat request (HARQ) process by comparing the transmission duration with the at least one threshold.

In some embodiments, a non-transitory computer readable medium stores instructions, which when executed by at least one processor, cause the at least one processor to perform any of the methods described above. In some embodiments, an apparatus includes at least one processor configured to implement any of the methods described above.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method comprising:

receiving, by a wireless communication device from a wireless communication node, a plurality of different parameters and at least one threshold, the plurality of different parameters selected from at least one of a repetition number, a resource assignment, or a scheduling delay;

determining, by the wireless communication device, a transmission metric according to the plurality of different parameters, wherein the transmission metric is determined by calculating the transmission metric using respective values of at least two different parameters of the plurality of different parameters; and determining, by the wireless communication device, whether to disable feedback in at least one hybrid automatic repeat request (HARQ) process according to a comparison of the transmission metric and the at least one threshold, wherein determining whether to disable the feedback comprises:

determining, by the wireless communication device, to enable feedback in a first HARQ process of the at least one HARQ process, responsive to the transmission metric being greater than or equal to a first threshold of the at least one threshold; and determining, by the wireless communication device, to disable the feedback in the first HARQ process, responsive to the transmission metric being less than or equal to the first threshold;

or determining, by the wireless communication device, to disable feedback in a first HARQ process of the at least one HARQ process, responsive to the transmission metric being greater than or equal to, a first threshold of the at least one threshold, and determining, by the wireless communication device, to enable the feedback in the first HARQ process, responsive to the transmission metric being less than or equal to the first threshold.

2. The method of claim 1, comprising:

receiving, by the wireless communication device from the wireless communication node, at least one of the plurality of different parameters via a downlink control information (DCI) transmission.

3. The method of claim 1, comprising:

receiving, by the wireless communication device from the wireless communication node, the at least one threshold via a radio resource control (RRC) or system information block (SIB) signaling.

4. The method of claim 1, wherein the first threshold comprises a threshold corresponding to a first transmission resource of the wireless communication device, and a second threshold of the at least one threshold corresponds to a second transmission resource of the wireless communication device.

5. The method of claim 4, wherein the transmission resource comprises or corresponds to a beam or beam direction of the wireless communication device.

6. The method of claim 1, comprising:

determining, by the wireless communication device, whether to disable the feedback in the at least one HARQ process according to a type of transmission setting of the wireless communication device.

7. The method of claim 6 wherein the type of transmission setting includes one of CEModeA or CEModeB.

8. The method of claim 1, comprising:

determining, by the wireless communication device, to disable the feedback when in a first type of transmission setting, and to disable or enable the feedback when not in the first type of transmission setting; or determining, by the wireless communication device, to enable the feedback when in the first type of transmission setting, and to disable or enable the feedback when not in the first type of transmission setting.

9. The method of claim 8, comprising:

determining, by the wireless communication device, to enable the feedback when in the first type of transmission setting; and determining, by the wireless communication device, to disable the feedback when not in the first type of transmission setting.

10. A method comprising:

sending, by a wireless communication node to a wireless communication device, a plurality of different parameters and at least one threshold, the plurality of different parameters selected from at least one of a repetition number, a resource assignment, or a scheduling delay, wherein the wireless communication device determines a transmission metric according to the plurality of different parameters by calculating the transmission metric using respective values of at least two different parameters of the plurality of different parameters, and determines whether to disable feedback in at least one hybrid automatic repeat request (HARQ) process according to a comparison of the transmission metric and the at least one threshold, wherein the wireless communication device determines whether to disable the feedback by:

determining to enable feedback in a first HARQ process of the at least one HARQ process, responsive to the transmission metric being greater than or equal to a first threshold of the at least one threshold; and determining to disable the feedback in the first HARQ process, responsive to the transmission metric being less than or equal to the first threshold;

or determining to disable feedback in a first HARQ process of the at least one HARQ process, responsive to the transmission metric being greater than or equal to, a first threshold of the at least one threshold, and determining to enable the feedback in the first HARQ process, responsive to the transmission metric being less than or equal to the first threshold.

11. The method of claim 10, comprising:

sending, by the wireless communication node to the wireless communication device, at least one of the plurality of different parameters via a downlink control information (DCI) transmission.

12. The method of claim 10, comprising:

sending, by the wireless communication node to the wireless communication device, at least one of the plurality of different parameters via a radio resource control (RRC) or system information block (SIB) signaling.

13. A wireless communication device, comprising:

at least one processor configured to:

receive, via a receiver from a wireless communication node, a plurality of different parameters and at least one threshold, the plurality of different parameters selected from at least one of a repetition number, a resource assignment, or a scheduling delay;

determine a transmission metric according to the plurality of different parameters, wherein the transmission metric is determined by calculating the transmission metric using respective values of at least two different parameters of the plurality of different parameters; and determine whether to disable feedback in at least one hybrid automatic repeat request (HARQ) process according to a comparison of the transmission metric and the at least one threshold, wherein the at least one processor determines whether to disable the feedback by:

determining to enable feedback in a first HARQ process of the at least one HARQ process, responsive to the transmission metric being greater than or equal to a first threshold of the at least one threshold; and determining to disable the feedback in the first HARQ process, responsive to the transmission metric being less than or equal to the first threshold;

or determining to disable feedback in a first HARQ process of the at least one HARQ process, responsive to the transmission metric being greater than or equal to, a first threshold of the at least one threshold, and determining to enable the feedback in the first HARQ process, responsive to the transmission metric being less than or equal to the first threshold.

14. The wireless communication device of claim 13, wherein the at least one processor is further configured to:

determine whether to disable the feedback in the at least one HARQ process according to a type of transmission setting of the wireless communication device.

15. The wireless communication device of claim 14, wherein the type of transmission setting includes one of CEModeA or CEModeB.

16. The wireless communication device of claim 13, wherein the at least one processor is further configured to:

determine to disable the feedback when in a first type of transmission setting, and to disable or enable the feedback when not in the first type of transmission setting; or determine to enable the feedback when in the first type of transmission setting, and to disable or enable the feedback when not in the first type of transmission setting.

17. The wireless communication device of claim 16, wherein the at least one processor is configured to:

determine to enable the feedback when in the first type of transmission setting; and determine to disable the feedback when not in the first type of transmission setting.

18. The wireless communication device of claim 13, wherein the first threshold comprises a threshold corresponding to a first transmission resource of the wireless communication device, and a second threshold of the at least one threshold corresponds to a second transmission resource of the wireless communication device.

19. The wireless communication device of claim 18, wherein the transmission resource comprises or corresponds to a beam or beam direction of the wireless communication device.

20. The wireless communication device of claim 13, wherein the at least one processor is configured to:

receive, via the receiver from the wireless communication node, at least one of the plurality of different parameters via a downlink control information (DCI) transmission; and receive, via the receiver from the wireless communication node, the at least one threshold via a radio resource control (RRC) or system information block (SIB) signaling.

* * * * *